UNITED STATES PATENT OFFICE.

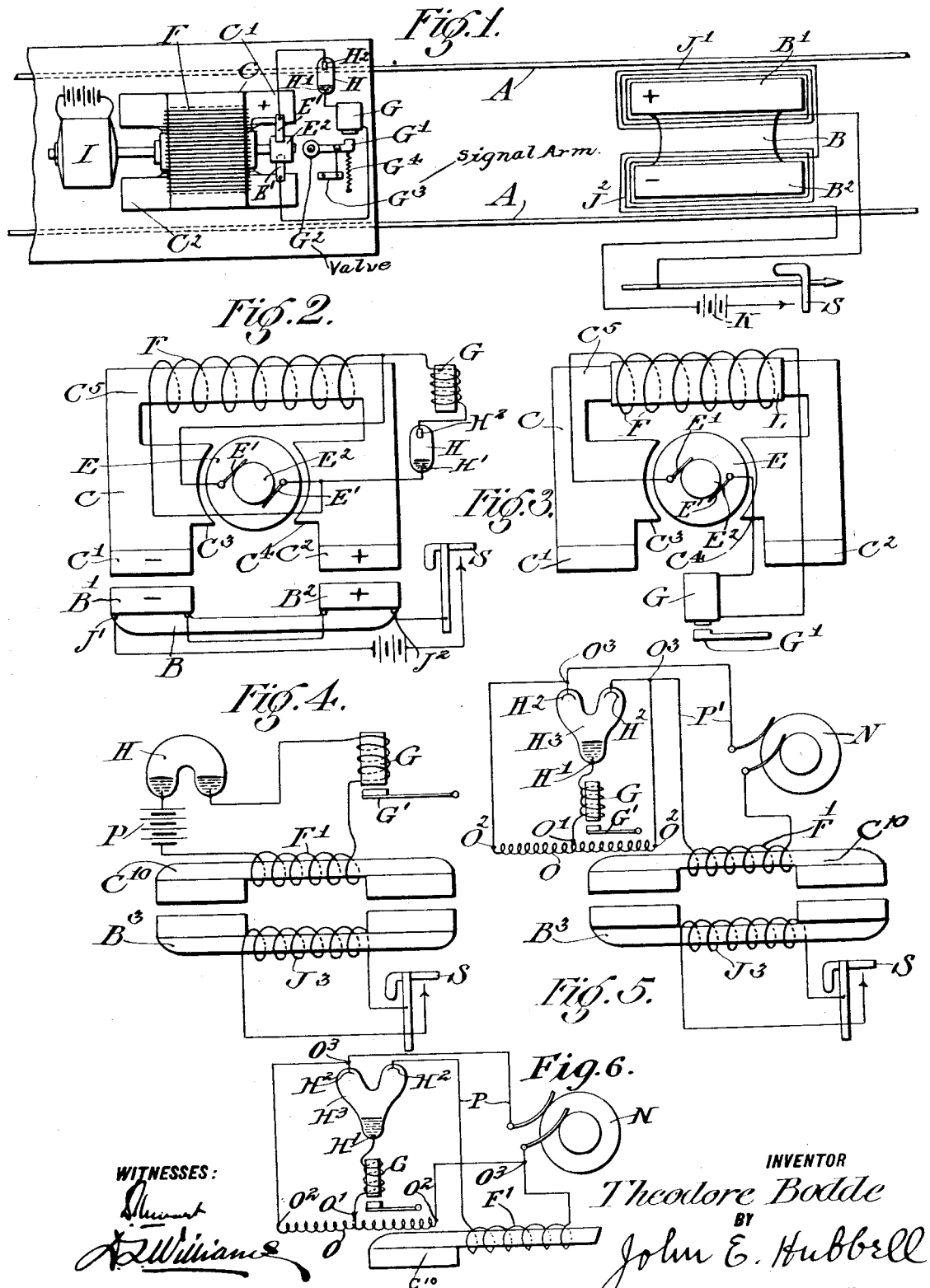

THEODORE BODDE, OF BRANT ROCK, MASSACHUSETTS, ASSIGNOR OF ONE-HALF TO ARCHIE G. SHAVER, OF DANVILLE, ILLINOIS.

VEHICLE CONTROLLING APPARATUS.

1,094,973.

Specification of Letters Patent. Patented Apr. 28, 1914.

Application filed August 22, 1908. Serial No. 449,832.

*To all whom it may concern:*

Be it known that I, THEODORE BODDE, a subject of the Queen of the Netherlands, residing in Brant Rock, in the county of Plymouth, in the State of Massachusetts, have invented a certain new and useful Improvement in Vehicle Controlling Apparatus, of which the following is a true and exact description, reference being had to the accompanying drawings, which form a part thereof.

My present invention relates to apparatus of the general type disclosed in my Patent 888,416 granted May 19th, 1908, in which a moving vehicle, such as a railway car, is provided with a device controlling the movement of the vehicle, which is actuated under certain special or all conditions, when a magnetic body carried by the vehicle, and which I call a train magnet, passes by a stationary magnet device, which I call a track magnet, the actuation of the controlling device being dependent upon the magnetic interaction between the train and track magnets.

The object of the present invention is to provide effective and reliable mechanism of the kind referred to, so constructed and arranged that the controlling device will be actuated in a positive and powerful manner whenever such actuation is proper, notwithstanding the substantial air gap, which, in practice, it is necessary, or at least desirable to provide, between the train and track magnets.

In the preferred form of the invention. I employ an electro-magnetic controlling device, and in conjunction therewith, an energizing circuit or circuits including the electro-magnetic device, a source of energizing current therefor and an electric arc, and so form the circuit arangements that I may utilize those properties of an electric arc whereby a relatively small diminution of the voltage impressed upon the terminals of the arc results in a relatively large decrease in the arc current and a relatively small decrease in the arc current results in a relatively large increase in the resistance of the arc and the cathode from which the arc is drawn, to create a substantial diminution of the current flowing through the electro-magnetic controlling device, when the train magnet passes over the track magnet and the latter is in the condition for actuating the controlling device.

Of the drawings: Figure 1 is a diagrammatic plan view illustrating the arrangement of a portion of a railway system equipped with my invention. Fig. 2 is a diagrammatic end elevation of a portion of the apparatus shown in Fig. 1. Fig. 3 is a view similar to Fig. 2 but showing a modified arrangement. Fig. 4 is a diagram illustrating a third form of the invention. Fig. 5 is a diagram illustrating another modification in which a mercury rectifier is employed, and Fig. 6 is a diagram illustrating a slight modification of the arrangement shown in Fig. 5.

In the drawings, and referring first to the apparatus shown in Figs. 1 and 2, A represents the track rails, B the track magnet and C the train magnet carried by a car or other vehicle running on the rails A. The train magnet C has poles $C^1$ $C^2$ spaced apart and adapted to pass in proximity to the poles $B^1$ and $B^2$ respectively of the track magnet. The train magnet C is also formed with poles $C^3$ and $C^4$ adapted to form the field poles of a current generator or dynamo, of which the armature E turns between the poles $C^3$ and $C^4$. The brushes $E^1$ bearing on the commutator $E^2$ supply current to the terminals of the electro-magnetic controlling device G, and in the form shown, also supply current to the terminals of a magnetizing coil F surrounding the yoke $C^5$ of magnet C, though coil F may be separately excited if desired, or indeed may be dispensed with if magnet C, or preferably only the yoke portion $C^5$ thereof, is permanently magnetized. In series with the brushes $E^1$ and device G is means for maintaining an electric arc such as the arc lamp H having a mercury cathode $H^1$ and an anode $H^2$ inclosed in an exhausted container. The armature E is continuously rotated by an electric motor I.

In practice, I prefer to employ an arc of the well known mercury vapor type, in which the terminals of the arc are inclosed in an exhausted container and in which the cathode at least is formed by a body of mercury. The use of the electric arc in the relation specified is particularly advantageous on account of the quickness with which it responds to changed conditions, since it comprises no moving parts and is practically without any inertia effect. Where the source of current for actuating the electro-magnetic controlling device supplies alternating current, I prefer to arrange the arc, especially if it is a mercury vapor arc, so as to utilize its capacity as a rectifier, and in this case I prefer to pass the rectified current through the electro-magnetic controlling device, thus obtaining the advantage of the use of an alternating current supply with a direct current electro-magnetic controlling device, instead of with a more complicated and less satisfactory alternating current electro-magnetic device.

My invention also comprises certain improvements in the train magnet and the means which I may employ for generating the current for energizing the controlling device. The last mentioned improvements may or may not be used in conjunction with an electric arc as described, though I prefer to use the latter in all cases.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described several of the numerous forms in which my invention may be embodied.

The armature $G^1$ of device G operates a valve or switch $G^2$ and a pivoted signal arm $G^3$. When, as in the normal condition of the apparatus, device G is energized, the armature $G^1$ is held up in the go-ahead position by magnetic attraction against the action of the spring $G^4$ which tends to pull the armature $G^1$ into the stop position.

The poles $B^1$ $B^2$ of the track magnet B are surrounded by magnetizing coils $J^1$ and $J^2$ respectively, the energization of which may be controlled manually or automatically as by switch blade S, which, when at clear, closes a circuit including coils $J^1$ and $J^2$ and battery K, and when at danger, interrupts this circuit. When the train magnet passes over the track magnet, the magnetic flux normally passing through the armature E between poles $C^3$ and $C^4$ is shunted or not by the track magnet accordingly, as the windings $J^1$ and $J^2$ are or are not deënergized. When these coils are deënergized, the diminution in the magnetic flux passing through the armature E, caused by the magnetic shunt about poles $C^3$ and $C^4$ and armature E formed by track magnet B, results in a decrease in current flow passing through device G with a consequent downward movement of armature $G^1$, thus stopping the car through the switch or valve $G^2$ or indicating through signal arm $G^3$ that the car should be stopped. If, however, coils $J^1$ and $J^2$ are energized when the train magnet is moved over the track magnet, the latter does not diminish the magnetizing action of the magnet C on armature E, since the parts are so arranged that poles $B^1$ and $B^2$ are then of the same polarity as the poles $C^1$ and $C^2$ respectively.

The use of an electric arc maintaining device such as the mercury vapor arc lamp H in series with the device G adds greatly to the effectiveness of the apparatus on account of those inherent properties of an electric arc whereby a relatively small decrease in the voltage impressed on the terminals of the arc greatly decreases the current flow through the arc and a relatively small decrease in the arc current produces a relatively great increase in the resistance of the arc and its cathode. In consequence of this characteristic, the provision of an arc in series with the device G and its source of energizing current greatly magnifies the effect on the former of a decrease in the electro-motive force impressed on the terminals of the circuit portion, including the device G and the arc, and the parts may well be so arranged that the arc will collapse or break when the train magnet passes over the energizing track magnet. Moreover, this magnifying effect is practically instantaneous, since the arc has no moving parts and offers nothing like an inertia effect interfering with a decrease in the current through it.

While I prefer to employ an arc, as shown for instance in Figs. 1 and 2, the special arrangement of the magnet C and armature E shown, may sometimes be used with advantage without the arc, as shown for instance in Fig. 3, where the arrangement differs from that of Figs. 1 and 2 in the omission of the arc and also in the fact, though this is not necessarily the case, that the coil F is in series with the device G and the core yoke $C^5$ is surrounded by a short circuited winding as a copper cylinder L to hold practically constant the magnetic flux passing through the yoke $C^5$. No claim is made broadly herein, however, to the use of a rotating armature in connection with a train magnet to increase the effect of a change in the magnetization of the magnet, as that combination is described and claimed in my prior copending application Serial Number 415,887, filed February 14th, 1908. An arc such as arc H may also be used with advantage in many cases with a simple train magnet, such as the magnet $C^{10}$ of Fig. 4. In this form of my invention, the coil $F^1$ surrounding the yoke of the magnet $C^{10}$ is connected in series with the device G and a source of direct current P. In this case the winding for the track magnet $B^3$ indicated at $J^3$ is either open or closed on itself by switch blade S or other controlling device, and need not include a source of current like the battery K of Fig. 1, since the difference between the inductive effects on the coil $F^1$ produced by the track magnet when the winding $J^3$ is open and when it is closed may be made sufficient to actuate the device G or not accordingly as the coil $J^3$ is open or closed. The action is more positive, however, if a source of direct current is provided in circuit with the magnetizing winding for the track magnet as in the arrangement of Fig. 1.

The advantage of using an electric arc and particularly of using a mercury vapor arc lamp may be had where the source of current for the arc and the controlling device G supplies alternating current as well as when such source supplies direct current, though with an alternating current supply for a mercury vapor arc lamp, certain well known modifications in the circuit connections for the lamp must be made. This is because the current flow through a mercury arc is essentially unidirectional at ordinary voltages. Where the source of current for the arc and controlling device G furnishes alternating current, I prefer to use a mercury arc rectifier and in Fig. 5, I have shown one of the many arrangements which I may use. In Fig. 5, the track magnet and the train magnet are arranged as in Fig. 4. $H^3$ represents the mercury arc rectifier which differs from the lamp H in the fact that there are two anodes $H^2$ which are connected by conductors to opposite sides of the source N supplying alternating current. The cathode $H^1$ of the rectifier is connected to the middle point $O^1$ of an inductive winding O, the terminals $O^2$ of which are connected at the points $O^3$ to the conductors. The device G is preferably connected in between the cathode $H^1$ and the point $O^1$ of the winding O. The coil $F^1$ of the train magnet $C^{10}$ may be connected between either anode $H^2$ and the point $O^3$ of the conductor $P^1$ leading from the anode or between either connected pair of points $O^2$ and $O^3$ or preferably as shown in Fig. 5 between one of the points $O^3$ and the adjacent side of the current source N. In Fig. 6 I have shown the coil $F^1$ as connected between the right hand anode $H^2$ and the corresponding point $O^3$ of the conductor $P^1$. With the arrangement shown, the device G is traversed by direct current, thus obviating any necessity for an alternating current electro-magnetic controlling device. As the coil $F^1$ is traversed by alternating current, a great increase in the self induction of the coil occurs when the train magnet passes over the track magnet and the winding on the latter is open. This change in the self induction of the coil $F^1$ may well be arranged to cause the arc in the rectifier $H^3$ to break. If the winding on the track magnet is closed on itself when the train magnet passes over the track magnet, little change in the self induction of coil $F^1$ and consequent disturbance in the current flow through device G will take place.

Having now described my invention, what I claim as new and desire to secure by Letters Patent is—

1. In combination, a railway car, an electromagnetic controlling device and a dynamo located on the car, said dynamo comprising a rotating armature and a normally excited field magnet for supplying current for actuating said controlling device, and a stationary magnetic body adapted to form with said field magnet a magnetic shunt about the armature of the dynamo.

2. In combination, a railway car, an electromagnetic controlling device and a dynamo located on the car, said dynamo comprising a rotating armature and a normally excited field magnet for supplying current for actuating said controlling device, a stationary magnetic body adapted to form with said field magnet a magnetic shunt about the armature of the dynamo, and means for rendering said magnetic body ineffective as a magnetic shunt.

THEODORE BODDE.

Witnesses:
 Thomas B. Blackman,
 Thomas Glover.